United States Patent [19]

Neale et al.

[11] Patent Number: 4,999,412
[45] Date of Patent: Mar. 12, 1991

[54] SILICONE-URETHANE COPOLYMERS

[75] Inventors: Robert S. Neale, Wilmington, N.C.; Curtis L. Schilling, Jr., Croton-on-Hudson, N.Y.

[73] Assignee: Union Carbide Chemicals and Plastics Company Inc., Danbury, Conn.

[21] Appl. No.: 372,465

[22] Filed: Jun. 28, 1989

[51] Int. Cl.$^5$ .............................................. C08G 77/04
[52] U.S. Cl. ...................... 528/28; 528/29; 528/38; 528/18; 528/21; 556/420
[58] Field of Search ...................... 528/28, 29, 38, 18, 528/21; 556/420

[56] References Cited

U.S. PATENT DOCUMENTS

| | | | |
|---|---|---|---|
| 2,907,782 | 10/1959 | Pike | 260/448.2 |
| 3,179,622 | 4/1965 | Haluska | 260/46.5 |
| 3,246,048 | 4/1966 | Haluska | 260/824 |
| 3,644,490 | 2/1972 | Schmelzer et al. | 260/482 |
| 4,098,742 | 7/1978 | Mueller | 428/391 |
| 4,493,926 | 1/1985 | Williams, Jr., et al. | 525/474 |
| 4,496,705 | 1/1985 | Florence et al. | 528/34 |
| 4,523,002 | 6/1985 | Campbell et al. | 528/26 |
| 4,525,567 | 6/1985 | Campbell et al. | 528/27 |
| 4,631,329 | 12/1986 | Gornowicz | 528/28 |

OTHER PUBLICATIONS

McGrath, Polym. Prepr., 26, 258 (1985).

Fukuda, Chem. Abstract 107:178804(f) (1987).

Primary Examiner—Melvyn I. Marquis
Attorney, Agent, or Firm—Bonnie L. Deppenbrock

[57] ABSTRACT

Linear silicone-urethane copolymers which contain tertiary amine or quaternary ammonium groups on the polymer backbone of the general formula:

{R'NR"SiMe$_2$(OSiMe$_2$)$_b$OSiMe$_2$R"NR'CONHR"NHCO$_2$(Y)O$_2$CNHR"NHCO}

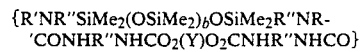

wherein Me represents a methyl group; R' represents a hydrogen atom or a lower alkyl group having one to three carbon atoms; R" represents a divalent hydrocarbon group having at least three carbon atoms such as (CH$_2$)$_{3\text{-}12}$; and Y represents (C$_z$H$_{2z+1}$N) where Z$\geq$5 and $\leq$22 and may be quaternized by use of a quaternizing agent R'X wherein X is selected from the group consisting of a halide atom, an acetate or higher carboxylate group, and an alkylsulfate group where the alkyl moiety has 1 to 12 carbon atoms and where R', R" and b may vary within each copolymer are described. These copolymers may be cast from organic solvents or from aqueous dispersions, providing films which possess high degrees of clarity and unexpectedly high strength and elasticity.

12 Claims, No Drawings

SILICONE-URETHANE COPOLYMERS

FIELD OF THE INVENTION

This invention relates to linear silicone-urethane copolymers which contain tertiary amine or quaternary ammonium groups on the polymer backbone. These copolymers may be cast from organic solvents or from aqueous dispersions, providing films which possess high degrees of clarity and unexpectedly high strength and elasticity.

BACKGROUND OF THE INVENTION

Silicone rubber compositions are known to possess desirable properties in terms of strength, elasticity, and performance over wide ranges of temperature. These properties are generally achieved through the use of finely divided inorganic fillers, e.g., silicas, and chemistries by which the rubbers are rendered infusible and insoluble by crosslinking. Thus, commercially useful silicone rubbers in ultimate applications, including those with high clarity, are both silica-filled and crosslinked.

Recently, a need has been recognized for silicone rubbers which are not permanently crosslinked, but which can be redissolved and reapplied as required in certain coating applications. One approach to such materials is described in U.S. Pat. Nos. 4,493,926, 4,496,705, 4,523,002, and 4,525,567, wherein zwitterionic groups (groups containing both chemically bound positive and negative charges) are used to reversibly crosslink silicone polymers through ionic interactions. Such polymers have pendant ionic groups, i.e., the ionic groups are not part of the polymer backbone, and also do not contain urethane segments.

A variety of silicone-urethane copolymers are known in the art, including some that contain fluorocarbon units, urethane units, urea units, and siloxane units as in U.S. Pat. No. 4,098,742. The latter are disclosed as being useful in providing coatings on a variety of substrates, but have not been examined as bulk silicone rubbers. The same patent describes incorporation of tertiary amine groups in the urethane portion of the backbone. These groups are then quaternized to ammonium groups by acetic acid for the purpose of preparing aqueous dispersions, i.e., such groups provide the property of dispersibility in water.

Similarly, U.S. Pat. No. 4,631,329 discloses silicone-urethane copolymers wherein the molar ratio of diisocyanate plus chain extender to isocyanate reactive species is at least four times that of all other isocyanate-reactive intermediates where at least 50% of the latter isocyanate-reactive intermediates is a polyol, such as tetramethylene glycol. According to this patent, the high molar ratio is employed to obtain copolymers with high hardness and moisture resistance.

U.S. Pat. No. 3,179,622 discloses moisture-curable isocyanato-functional silicones. These polymers are non-linear, both before and after moisture curing, which occurs through formation of permanent crosslinks. Similarly, U.S. Pat. No. 3,246,048 discloses reactions of hydroxyalkyl-functional silicones with diisocyanates and hydroxylated polyethers. The products of such reactions are used in the preparation of silicone-urethane foams.

SUMMARY OF THE INVENTION

It has now been found that linear silicone-urethane copolymers containing tertiary amine or quaternary ammonium groups, i.e., non-zwitterionic groups, in the urethane portions of the copolymer backbone, have unexpectedly good properties in terms of clarity, strength, and elasticity. It has also been found that such copolymers can be prepared from readily available raw materials and that such copolymers can be cast from organic solvents or from aqueous dispersions to provide films with the above-mentioned desirable properties.

DETAILED DESCRIPTION OF THE INVENTION

The linear silicone-urethane copolymers of the instant invention have repeating unit structures which may be represented by the following formula (I):

wherein Me represents a methyl group; R' represents a hydrogen atom or a lower alkyl group having one to three carbon atoms; R" represents a divalent hydrocarbon group having at least three carbon atoms such as $(CH_2)_{3-12}$; Y represents a divalent hydrocarbon group containing a tertiary amine $(C_zH_{2z+1}N)$ wherein z is $\geq 5$ and $\leq 22$, or a quaternary ammonium group $(C_zH_{2z+1}N^+X^-R')$ derived therefrom by reaction with a quaternizing agent R'X, wherein X represents a monoanion such as a halogen atom (e.g., Cl, Br or I), an acetate or higher carboxylate group, or an alkylsulfate group whose alkyl moiety has one to about 12 carbon atoms; b is an integer of from about 10 to about 100; and wherein R', R" and b may vary within each copolymer.

When Y has been quaternized to a group such as $CH_2R'CH_2N^+X^-RR'CH_2CHR'$, the copolymer structure may be represented by the following formula (II):

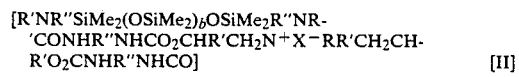

wherein R represents a lower alkyl group having one to eight carbon atoms; and Me, R', R", X and b are as defined above.

Similarly, when Y is a tertiary amine-containing group such as $CH_2CH(CH_2NR_2)$, the copolymer structure may be represented by the following formula (III):

The linear silicone-urethane copolymers of the present invention may be prepared using known techniques. For example, the linear silicone-urethane copolymers of formula (II) may be prepared by reacting about one mole of a tertiary amine diol such as bis(hydroxyalkyl) alkylamine of the following formulae (IV):

with about 2 moles of a diisocyanate of the following formula (V):

OCNR"NCO  [V]

in the presence of a urethane-forming catalyst and in a suitable inert solvent, to yield an intermediate reaction product of the following formula (VI):

Y(O$_2$CNHR"NCO)$_2$  [VI]

The intermediate reaction product (VI) may then be reacted in a suitable inert solvent, with a bis(aminoalkyl)-endblocked silicone of the following formula (VII):

R'NHR"SiMe$_2$(OSiMe$_2$)$_b$OSiMe$_2$R"NHR'  [VII]

to yield a copolymer of the following formula (VIII):

[R'NR"SiMe$_2$(OSiMe$_2$)$_b$OSiMe$_2$R"NR-'CONHR"NHCO$_2$(Y)O$_2$CHNR"NHCO]  [VIII]

Copolymer (VIII) may then be reacted, in a suitable inert solvent, with a quaternizing agent R'X, wherein R' and X have the same meaning as given above, to yield, for example, the copolymer of formula (II) above. In each of formulas (III)–(VIII), Me, R, R', R" and b have the same meaning as given above.

A copolymer of formula (III), may be obtained using the same reaction sequence as above described but starting with 3-dimethylamino-1,2-propanediol instead of a bis(hydroxyalkyl) alkylamine and ending with the reaction product of the intermediate and a bis(aminoalkyl)-endblocked silicone.

The raw materials from which the silicone-urethane copolymers of the instant invention are prepared are well-known in the art. For example, the preparation of 3-aminopropyl-endblocked silicones is discussed in detail by McGrath (Polym. Prepr., 26, 258 (1985)). The tertiary amine diols are articles of commerce, as are the diisocyanates. Reactions between tertiary amine diols such as bis(hydroxyalkyl)alkylamines and diisocyanates are also well known, with the reaction product derived from ten moles of 1,6-hexanediisocyanate and two moles of N-methyldiethanolamine being described in U.S. Pat. No. 3,644,490. The product is disclosed as an amine catalyst capable of being incorporated into urethane foams, using at least 3 molar excess of diisocyanate over hydroxyl groups.

Tertiary amine diols of formula (IV) are exemplified by bis(hydroxyalkyl) alkylamines such as MeN(CH$_2$CHMeOH)$_2$,, EtN(CH$_2$CH$_2$OH)$_2$, EtN(CH$_2$CHMeOH)$_2$, and the like, wherein Me is methyl and Et represents ethyl, with such bis(hydroxyalkyl)alkylamines being selected for reasons of reactivity and solubility in suitable organic solvents, such as tetrahydrofuran, monoglyme and diglyme. The primary alcohols are the more reactive, and therefore the more preferred compounds. Other tertiary amine diols such as HOCH$_2$CH(CH$_2$NMe$_2$)OH or HOCH$_2$CH(CH$_2$NEt$_2$)OH are also useful and preferred. Unsatisfactory results have been obtained with compounds such as bis(hydroxyethyl) piperazine which are insoluble in the suitable organic solvents.

When the tertiary amine diol is N-methyldiethanolamine the resulting linear silicone-urethane copolymer has a structure represented by the following formula (IX):

[R'NR"SiMe$_2$(OSiMe$_2$)$_b$OSiMe$_2$R"NR-'CONHR"NHCO$_2$CH$_2$CH$_2$NRCH$_2$CH$_2$O$_2$CHNR"NHCO]  [IX]

The diisocyanate reactant should be an aliphatic diisocyanate where R" can be (CH$_2$)$_{3-12}$, such as 1,6-hexanediisocyanate, where R"=(CH$_2$)$_6$, which is the preferred reactant. Aromatic diisocyanates such as toluene diisocyanate are less preferred because products derived therefrom are less stable to degradation by light exposure. Suitable additional diisocyanates include the following:
1,2-ethylene diisocyanate;
1,6-hexylene diisocyanate;
bis(2-isocyanatoethyl) fumarate;
1,4-cyclohexylene diisocyanate;
methylcyclohexylene diisocyanate;
2,2,4-(or 2,4,4-)trimethyl-1,6-hexylene diisocyanate;
2,6-toluene diisocyanate;
4,4'-diisocyanatodiphenyl ether;
4,4'-diisocyanatodiphenylmethane;
3,3'dichloro-4,4'-diisocyanatodiphenylmethane;
4,4'-diphenyl diisocyanate;
4,4'-diisocyanatodibenzyl;
3,3'-dimethyl-4,4'-diisocyanatodiphenyl;
2,2'-dimethyl-4,4'-diisocyanatodiphenyl;
3,3'-dimethoxy-4,4'-diisocyanatodiphenyl;
2,2'-dichloro-5,5'-dimethoxy-4,4'-diisocyanatodiphenyl;
3,3'-dichloro-4,4'-diisocyanatodiphenyl;
1,3-diisocyanatobenzene;
1,4-diisocyanatobenzene;
1,2-naphthylene diisocyanate;
4-chloro-1,2-naphthylene diisocyanate;
4-methyl-1,2-naphthylene diisocyanate;
1,3-naphthylene diisocyanate;
1,4-naphthylene diisocyanate;
1,5-naphthylene diisocyanate;
1,6-naphthylene diisocyanate;
1,7-naphthylene diisocyanate;
1,8-naphthylene diisocyanate;
4-chloro-1,8-naphthylene diisocyanate;
2,3-naphthylene diisocyanate;
2,7-naphthylene diisocyanate;
1,8-dinitro-2,7-naphthylene diisocyanate;
1-methyl-2,4-naphthylene diisocyanate;
1-methyl-5,7-naphthylene diisocyanate;
6-methyl-1,3-naphthylene diisocyanate;
7-methyl-1,3-naphthylene diisocyanate;
Dimer Acid diisocyanate (DDI, General Mills); and
3-isocyanatomethyl-3,5,5-trimethylcyclohexylisocyanate The solvents which may be used are those which dissolve both reactants and products, and which are inert to reaction with isocyanate groups, hydroxyl groups, or amine groups. Miscibility with water is desirable for later preparation of aqueous dispersions. Preferred solvents include tetrahydrofuran, monoglyme, and diglyme, with tetrahydrofuran being most preferred. Amine or alcohol solvents are not desirable due to their reactivity with the diisocyanate.

Catalysts for urethane-forming reactions include those typical and well known in the art for the reactions of alcohols with isocyanates. These include soluble compounds of tin, such as dibutyltin dilaurate and stannous octoate, and tertiary amines, such as triethylamine. Dibutyltin dilaurate and stannous octoate are preferred.

The bis(aminoalkyl)-endblocked silicones of formula (VII) may have primary amine groups as in bis(3-aminopropyl)-endblocked polydimethylsilicones (R'=H, R"=(CH$_2$)$_3$) or secondary amine groups as in bis(N,2-dimethylaminopropyl)- endblocked polydimethylsilicones where R'=Me, R"=CH$_2$CHMeCH$_2$, as disclosed in U.S. Pat. No. 4,631,329. 3-Aminopropyl-endblocking groups are preferred. The end block groups should be selected so as to ensure that each end of the silicone polymer has at least one —H on the amine nitrogen.

The elastomeric properties of the instant silicone-urethane copolymers vary with the content of dimethylsilicone units, (OSiMe$_2$). When b is less than 10, the copolymer starts to lose its elastomeric properties and is too stiff due to the presence of a higher percentage of "hard" urethane units. When b is greater than 100, the copolymer obtains too much silicone character and is too soft. Therefore, a range of b=10–100 is preferred for the products of this invention, and the more preferred copolymers are obtained when b=15–50. The most preferred copolymers are obtained when b=24–28.

Due to their instability, reaction intermediates should be used shortly after preparation or stored in the cold; to prevent unwanted side reactions, a minimum of the isocyanate should be reacted with the amino alkyl silicone. Accordingly, the isocyanate-terminated intermediate should be added to the aminoalkylterminated silicone for cleaner reactions.

The quaternizing agent, R'X, may be an alkylating agent such as a methylhalide (chloride, bromide, or iodide) or dimethyl sulfate, or a proton donor such as acetic acid or hydrochloric acid. Both types of quaternizing agents are effective and both types are preferred as quaternizing agents.

The products of the instant invention may optionally be converted to room temperature vulcanizing compositions by incorporating commercially available reactive silanes as reactants, i.e., by replacing a small portion of the bis(aminoalkyl)-endblocked silicone with reactive silanes such as 3-aminopropyltrimethoxysilane, or by replacing a small portion of the diisocyanate with the reactive silane 3-isocyanatopropyltrimethoxysilane. Exposure to moisture then causes crosslinking by condensation of trialkoxysilane groups, as is well known in the art. Alternatively, silicones endblocked with 3-aminopropyldimethoxysilane groups can be used.

In order to obtain the maximum clarity for the films cast from the copolymers of the present invention, vacuum devolatilization of the copolymer solution prior to film formation is recommended.

It is believed that significant variation from the preferred aspects of the instant invention will result in products with reduced performance in terms of clarity, strength, or elasticity.

It is hereby noted that the preferred synthetic route involves preparation of isocyanate-terminated urethane intermediates containing tertiary amine groups, and reaction of those intermediates with bis(aminoalkyl)-endblocked silicones. Those skilled in the art will recognize that bis-(hydroxyalkyl)-endblocked silicones can be substituted for bis(aminoalkyl)-endblocked silicones, although reaction rates may be slower such that a urethane-forming catalyst may be required. Such substitution would lead to urethane links between silicone and urethane blocks, rather than urea links as in the instant invention. Similarly, a molar excess of bis(hydroxyalkyl)alkylamine in the initial step would lead to a hydroxy-terminated urethane intermediate which could then be reacted with an isocyanatoalkyl-endblocked silicone to provide like urethane links between silicone and urethane blocks. While not wishing to be bound by any theory, it is believed that the urea links of the instant invention, in addition to the tertiary amine or quaternary ammonium groups, provide for the observed and desirable properties of clarity, strength, and elasticity.

While the properties of clarity, strength, and elasticity are most observable in bulk pieces such as films, the silicone-urethane copolymers of the instant invention can also be applied as coatings from organic solvents such as those used in the copolymer preparation or from aqueous dispersions to various substrates, including glass, glass fibers, metal and ceramics from which they can then be easily removed in a later processing step by application of heat or water, for example. They thus serve as film-formers, lubricants, or release agents in a temporary sense.

When applied to glass fibers, the products of the present invention can improve the ease of handling of the fibers without reducing the strength of the fibers as much as presently used methods.

The copolymers of the present invention may also be used to make shatter resistant glass by applying a coating of the copolymer between glass sheets, and would therefore be useful in applications such as car windshields and aircraft canopies.

The following examples are provided to illustrate the present invention, not to limit it in any way.

In the examples, all reactions were run in standard laboratory glassware of various sizes using heating mantles, addition funnels, mechanical stirrers, thermometers, water condensers, and provisions for maintaining nitrogen atmospheres. The abbreviations, Me, g, mm, ml, min, hr, and THF represent methyl, gram, millimeter, milliliter, minutes, hour, and tetrahydrofuran, respectively. Standard titration methods were used to determine the contents of active amine groups and active isocyanate groups for stoichiometric calculations.

All polymers produced in accordance with this invention are thermally stable until about 250° C., with thermogravimetric analysis showing complete decomposition by 550° C.

EXAMPLE 1

In a 250 ml three-necked round bottom, standard taper flask with appropriate attachments as described above were placed (under N$_2$ atmosphere) 66.7 g (0.4 mol) of 1,6-hexanediisocyanate. Heat was applied to 70° C., and about 1/10 of 23.8 g (0.2 mol) of N-methyldiethanolamine was added from the addition funnel with stirring. Catalyst (dibutyltin dilaurate, 50 microliters) was added by syringe, causing an exotherm to 80° C. The mantle was removed and addition of amine completed at a rate which maintained temperature at 75°–80° C. (in 30 min), followed by heating at the same temperature for 30 min longer. THF was added to make a solution containing 2.33 milliequivalents of active isocyanate/ml.

In a similar apparatus was placed a solution of 24.7 g of H$_2$N(CH$_2$)$_3$SiMe$_2$(OSiMe$_2$)$_{50}$OSiMe$_2$(CH$_2$)$_3$NH$_2$ (equivalent weight=1900) and 100 ml of THF. A portion of the above diisocyanate/amine product (5.75 ml, 3% equivalent excess) was diluted with 50 ml of THF and added with stirring under N$_2$ to the aminosilicone solution over 25 min. The reaction mixture was warmed to 52° C. over 20 min, with 20 ml of THF added to reduce viscosity, and allowed to cool. A portion of the resultant solution (140 g) was then quaternized with 0.7 g of dimethyl sulfate, with 120 ml of THF being added in increments to reduce viscosity. A portion of the product solution (8.5% active as solids in THF) was cast in a Teflon ® dish at room temperature to form a clear, tough, elastic film. Another portion was converted to an aqueous dispersion by adding a weight of $H_2O$ equal to the amount of copolymer plus THF solvent used, and subsequently stripping off the THF solvent; the dispersion also dried to tough, elastic films. Thinner films cast on glass dishes were adherent but were removable by simple soaking in water.

EXAMPLE 2:

The procedure of Example 1 was repeated, except that a bis(3-amino-propyldimethoxysilyl)-endblocked silicone, $H_2N(CH_2)_3(MeO)_2Si(OSiMe_2)_{45}OSi(OMe_2)(CH_2)_3NH_2$ (equivalent weight=1848) was used in place of the silicone of Example 1. Quaternization with dimethyl sulfate and film casting provided a clear, tough, elastic film.

EXAMPLE 3:

The procedure of Example 1 was repeated except that $H_2N(CH_2)_3SiMe_2(OSiMe_2)_{28}SiMe_2(CH_2)_3NH_2$ was used in place of the silicone of Example 1. Films cast from THF or from aqueous dispersion were clear, tough, and elastic.

EXAMPLE 4:

The procedure of Example 3 was followed except that one portion was quaternized with acetic acid, and one portion with toluenesulfonic acid. Clear, strong, elastic films were obtained in each case.

EXAMPLE 5:

The procedure of Example 3 was followed except that 3-dimethylamino-1, 2-propanediol was used in place of N-methyldiethanolamine. Quaternization with acetic acid or trifluoroacetic acid and film casting from THF or from aqueous dispersion yielded clear, tough, elastic films in each case.

EXAMPLE 6:

The procedure of Example 1 was followed except that a 3/2 ratio of diisocyanate/amine was used instead of 2/1. Quaternization with dimethyl sulfate and film casting yielded films which were clear and very elastic, but not as strong as those of Example 1.

EXAMPLE 7:

The procedure of Example 3 was followed except that bis(4-isocyanato-cyclohexyl) methane was used in place of 1,6-hexanediisocyanate. Quaternization with hydrogen chloride and film casting provided films which were strong but somewhat yellow. This product would not disperse in water, and therefore could not be cast from water.

EXAMPLE 8:

Example 1 was repeated except that $H_2N(CH_2)_3SiMe_2(OSiMe_2)_{15}OSiMe_2(CH_2)_3NH_2$ was used in place of the silicone of Example 1. Quaternization with acetic acid and casting of films from aqueous dispersion provided clear, strong, elastic films.

EXAMPLE 9:

Thick films from products of examples 4, 5 and 8 were cast and "dogbone" samples were cut for evaluation in a Monsanto Tensiometer Model 500. Samples cast from products of Example 4, 5, and 8, all as quaternized with acetic acid, were clear and provided instrumental values of greater than 800% elongation to break and greater than 880 psi tensile strength.

EXAMPLE 10:

Aqueous dispersions were prepared by procedures from three examples. First, the procedure of Example 1 was followed except that quaternization was done with acetic acid. Second, the procedure of Example 1 was followed except that $Me_2NCH_2CHOHCH_2OH$ was used in place of $MeN(CH_2CH_2OH)_2$ and acetic acid was used for quaternization. Third, the procedure of Example 4 was followed with quaternization by acetic acid. The resulting three aqueous dispersions were diluted to 4% concentrations (active as solids) and applied to glass cloth samples. One series of samples was extracted with acetone, while two series were heated to 40° C. and then extracted with acetone or water. Acetone-extractables of the unheated samples were greater than 90%, while those of one of the heated samples were 24–42%. Acetone extractables of the other series of heated samples were only 5–15%. This example shows that products of the instant invention can provide either "temporary" or "permanent" coatings on glass fibers, depending on thermal history.

We claim:

1. A linear silicone-urethane copolymer capable of providing films of high strength and elasticity, having repeating unit structures represented by the following formula:

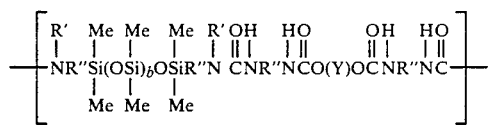

wherein R' is selected from the group consisting of hydrogen and alkyl groups having 1 to 3 carbon atoms; R" is a divalent hydrocarbon group having at least 3 carbon atoms;

b is about 10–100;

Y represents a divalent hydrocarbon group containing a tertiary amine $(C_zH_{2z+1}N)$ wherein z is 5 to 22 or a quarternary ammonium group $(C_zH_{2z+1}N^+X^-R')$ wherein X is selected from the group consisting of a halide atom, an acetate or high carboxylate group, and an alkylsulfate group where the alkyl moiety has 1 to 12 carbon atoms; and wherein R', R" and b may vary within each copolymer.

2. The silicone-urethane copolymer according to claim 1 wherein b=15–50.

3. The silicone-urethane copolymer according to claim 1 wherein b=24–28.

4. The silicone-urethane copolymer according to claim 1 cast into a film.

5. The silicone-urethane copolymer according to claim 4 wherein the cast film has an elongation to break of at least 750%.

6. The silicone-urethane copolymer according to claim 4 wherein the cast film has a tensile strength greater than about 800 psi.

7. The silicone-urethane copolymer according to claim 4 wherein the cast film is clear.

8. The silicone-urethane copolymer according to claim 1 wherein
R'=H
R"=(CH$_2$)$_6$ or (CH$_2$)$_3$;
Y=CHR'CH$_2$N+X$^-$HRCH$_2$CHR'wherein R is an alkyl group having 1 to 8 carbon atoms [CHR'CH$_2$N+X$^-$HR'CH$_2$CHR']; and
b=24-28.

9. A linear silicone-urethane copolymer capable of providing films of high strength and elasticity, having repeating unit structures represented by the following formula:

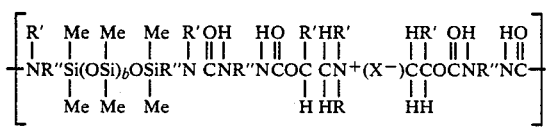

wherein R is selected from the group consisting of hydrogen and alkyl groups having 1 to 8 carbon atoms;

R' is selected from the group consisting of hydrogen and alkyl groups having 1 to 3 carbon atoms;

R" is a divalent hydrocarbon group having at least 3 carbon atoms;

b is about 10-100;

X is selected from the group consisting of a halide atom, an acetate or higher carboxylate group, and an alkylsulfate group where the alkyl moiety has 1 to 12 carbon atoms; and wherein R, R', R" and b may vary within each copolymer.

10. A linear silicone-urethane copolymer capable of providing films of high strength and elasticity, having repeating unit structures represented by the following formula:

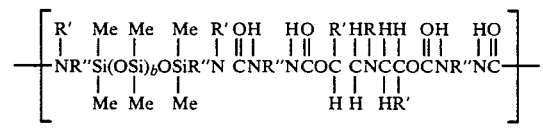

wherein
R is a alkyl groups having 1 to 8 carbon atoms

R' is selected from the group consisting of hydrogen and alkyl groups having 1 to 3 carbon atoms:

R$\Delta$ is a divalent hydrocarbon group having at least 3 carbon atoms;

b is about 10-100; and wherein R, R',R" and b may vary within each copolymer.

11. A linear silicone-urethane copolymer capable of providing films of high strength and elasticity, having repeating unit structures represented by the following formula:

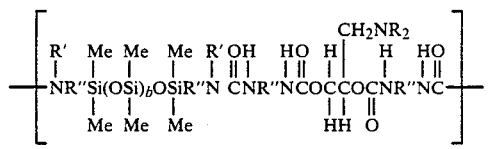

wherein
R is a alkyl groups having 1 to 8 carbon atoms;

R' is selected from the group consisting of hydrogen and alkyl groups having 1 to 3 carbon atoms;

R" is a divalent hydrocarbon group having at least 3 carbon atoms;

b is about 10-100; and wherein R, R', R" may vary within each copolymer.

12. A linear silicone-urethane copolymer capable of producing films of high strength and elasticity, having repeating unit structures represented by the following formula:

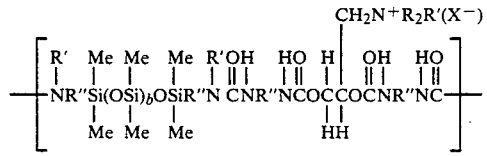

wherein
R is a alkyl groups having 1 to 8 carbon atoms;

R' is selected from the group consisting of hydrogen and alkyl groups having 1 to 3 carbon atoms;

R" is a divalent hydrocarbon group having at least 3 carbon atoms;

b is about 10-100;

X is selected from the group consisting of a halide atoms, an acetate or higher carboxylate group, and an alkylsulfate group where the alkyl moiety has 1 to 12 carbon atoms; and wherein R, R', R" and b may vary within each copolymer.

* * * * *